(12) United States Patent
Kuster et al.

(10) Patent No.: US 12,428,904 B2
(45) Date of Patent: Sep. 30, 2025

(54) SPACER FOR INSULATED GLASS UNITS

(71) Applicant: SAINT-GOBAIN GLASS FRANCE, Courbevoie (FR)

(72) Inventors: Hans-Werner Kuster, Aachen (DE); Christopher Marjan, Aachen (DE); Walter Schreiber, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 746 days.

(21) Appl. No.: 17/627,406

(22) PCT Filed: Jul. 14, 2020

(86) PCT No.: PCT/EP2020/069901
§ 371 (c)(1),
(2) Date: Jan. 14, 2022

(87) PCT Pub. No.: WO2021/009176
PCT Pub. Date: Jan. 21, 2021

(65) Prior Publication Data
US 2022/0243526 A1 Aug. 4, 2022

(30) Foreign Application Priority Data
Jul. 17, 2019 (EP) ..................................... 19186751

(51) Int. Cl.
*E06B 3/66* (2006.01)
*B32B 1/08* (2006.01)
(Continued)

(52) U.S. Cl.
CPC ...... *E06B 3/66323* (2013.01); *E06B 3/67326* (2013.01); *E06B 3/66352* (2013.01); *E06B 3/66361* (2013.01)

(58) Field of Classification Search
CPC ... B32B 1/08; Y10T 428/13; Y10T 428/1352; Y10T 428/1362; Y10T 428/1386;
(Continued)

(56) References Cited

U.S. PATENT DOCUMENTS 4,057,945 A * 11/1977 Kessler ............... E06B 3/66352
52/204.593
4,113,905 A 9/1978 Kessler
(Continued)

FOREIGN PATENT DOCUMENTS

CH 630993 A5 * 7/1982 ......... E06B 3/66314
DE 19530838 A1 * 2/1997 ......... E06B 3/66319
(Continued)

OTHER PUBLICATIONS

List of thermal conductivities of various plastics; https://www.alfa-chemistry.com/plastics/resources/plastic-thermal-conductivity-reference-table.html.*
(Continued)

*Primary Examiner* — Z. Jim Yang
(74) *Attorney, Agent, or Firm* — Pillsbury Winthrop Shaw Pittman LLP (57) ABSTRACT

A spacer for insulated glass units includes a main body co-extruded from first and second plastics, the second plastic having lower thermal conductivity and higher flexibility than the first plastic. The main body includes first and second side walls arranged parallel to each other, a glazing interior wall connecting to the side walls, an outer wall, which is arranged substantially parallel to the glazing interior wall and connects the side walls to one another directly or via connecting walls, and a cavity, which is enclosed by the side walls, the glazing interior wall, and the outer wall or by the side walls, the glazing interior wall, the outer wall, and the connecting walls. The main body is designed as a hollow
(Continued)

profile formed from the second plastic, in which hollow profile the first plastic is arranged, at least in some regions, on the inside directly adjacent the hollow profile.

13 Claims, 5 Drawing Sheets (51) Int. Cl.
*E06B 3/663* (2006.01)
*E06B 3/673* (2006.01)

(58) Field of Classification Search
CPC ......... Y10T 428/1379; Y10T 428/1383; E06B 3/66314; E06B 3/66319; E06B 3/66328
See application file for complete search history.

(56) References Cited

U.S. PATENT DOCUMENTS

| | | | | |
|---|---|---|---|---|
| 4,296,587 A * | 10/1981 | Berdan | .................... | E06B 3/667 403/395 |
| 4,564,540 A * | 1/1986 | Davies | .................... | E06B 3/667 428/188 |
| 4,719,728 A * | 1/1988 | Eriksson | ............... | E06B 3/5418 52/786.13 |
| 5,461,840 A * | 10/1995 | Taylor | ................. | E06B 3/66323 52/786.13 |
| 5,487,937 A * | 1/1996 | Newby | ................... | E06B 3/667 428/317.1 |
| 6,339,909 B1 * | 1/2002 | Brunnhofer | ......... | E06B 3/66319 52/786.13 |
| 6,389,779 B1 * | 5/2002 | Brunnhofer | ......... | E06B 3/66319 52/786.13 |
| 2001/0001357 A1 * | 5/2001 | Reichert | ............. | E06B 3/66366 52/204.5 |
| 2003/0074859 A1 * | 4/2003 | Reichert | ............. | E06B 3/66323 52/786.13 |
| 2004/0118082 A1 * | 6/2004 | Paci | .................... | E06B 3/66314 52/786.13 |
| 2012/0137608 A1 * | 6/2012 | Plant | ................... | E06B 3/66314 52/204.593 |
| 2012/0297708 A1 * | 11/2012 | Brunnhofer | ......... | E06B 3/66319 52/309.1 |
| 2013/0108815 A1 * | 5/2013 | Trautz | ................. | E06B 3/66319 428/35.8 |
| 2013/0316184 A1 * | 11/2013 | Siodla | ................. | E06B 3/66361 428/34 |
| 2014/0311065 A1 * | 10/2014 | Schreiber | .............. | E06B 3/6733 52/204.593 |
| 2017/0298680 A1 * | 10/2017 | Schreiber | ............ | E06B 3/66314 |
| 2018/0058139 A1 * | 3/2018 | Schwerdt | ................ | E06B 3/66319 |
| 2018/0073292 A1 * | 3/2018 | Graham | ................ | E06B 3/66328 |
| 2018/0298673 A1 * | 10/2018 | Runze | ................. | E06B 3/66319 |
| 2018/0298674 A1 * | 10/2018 | Runze | ..................... | E06B 3/221 |
| 2019/0218851 A1 * | 7/2019 | Nea | ..................... | E06B 3/66352 |
| 2020/0324451 A1 * | 10/2020 | Kuster | ................... | B29C 48/12 |
| 2020/0340292 A1 * | 10/2020 | Ettridge | .............. | E06B 3/66328 |

FOREIGN PATENT DOCUMENTS

| | | | | |
|---|---|---|---|---|
| DE | 19805265 A1 * | 4/1999 | ......... | E06B 3/66342 |
| DE | 198 07 454 A1 | 8/1999 | | |
| DE | 10 2011 009 359 A1 | 7/2012 | | |
| DE | 202015105146 U1 * | 1/2016 | ......... | E06B 3/66319 |
| DE | 10 2015 122 714 A1 | 7/2017 | | |
| EP | 0 852 280 A1 | 7/1998 | | |
| EP | 1 055 046 B2 | 9/2007 | | |
| EP | 3 241 972 A1 | 11/2017 | | |
| KR | 20130129754 A * | 11/2013 | ......... | E06B 3/67317 |
| WO | WO 2013/104507 A1 | 7/2013 | | |
| WO | WO 2015/043848 A1 | 4/2015 | | |
| WO | WO 2015/086459 A1 | 6/2015 | | |
| WO | WO 2016/046081 A1 | 3/2016 | | |
| WO | WO 2016/091646 A1 | 6/2016 | | |
| WO | WO-2018050357 A1 * | 3/2018 | ............. | B29C 48/00 |

OTHER PUBLICATIONS

Properties of phenolic foam of varying densities, from MatWeb.*
Properties of thermoset polyurethane foam from MatWeb.*
Protperties of Extruded PVC from MatWeb.*
Sparks, L. L., and Arvidson, J. M. Thermal and Mechanical Properties of Polyurethane Foams and a Survey of Insulating Concretes at Cryogenic Temperatures; pp. 38-56, 75. (Year: 1984).*
Machine translation of CH 630993 A5.*
Machine translation of DE 19530838 A1.*
Machine translation of DE 19805265 A1.*
Machine translation of DE 202015105146 U1.*
Machine translation of KR 2013/0129754 A.*
International Search Report as issued in International Patent Application No. PCT/EP2020/069901, dated Oct. 20, 2020.

* cited by examiner

SPACER FOR INSULATED GLASS UNITS

CROSS-REFERENCE TO RELATED APPLICATIONS

This application is the U.S. National Stage of PCT/EP2020/069901, filed Jul. 14, 2020, which in turn claims priority to European patent application number 19 186 751.4 filed Jul. 17, 2019. The content of these applications are incorporated herein by reference in their entireties.

The invention relates to a spacer for insulated glass units, an insulated glass unit, a method for producing an insulated glass unit, and use thereof.

Insulated glass units usually contain at least two panes made of glass or polymeric materials. The panes are separated from one another via a gas or vacuum space defined by the spacer. The thermal insulation capacity of insulating glass is significantly greater than that of single-pane glass and can be even further increased and improved in triple glazing units or with special coatings. Thus, for example, silver-containing coatings enable reduced transmittance of infrared radiation and thus reduce the cooling of a building in the winter.

In addition to the nature and the structure of the glass, the other components of an insulated glass unit are also of great significance. The seal and especially the spacer have a great influence on the quality of the insulated glass unit. Especially the contact points between the spacer and the glass pane are very susceptible to temperature and climate fluctuations. The connection between the pane and the spacer is produced via an adhesive bond of an organic polymer, for example, polyisobutylene. Besides the direct effects of temperature fluctuations on the physical properties of the adhesive bond, the glass itself in particular has an effect on the adhesive bond. The glass and spacers have different coefficients of linear thermal expansion, in other words, temperature changes cause them to expand differently. Due to the changes in temperature, for example, from sunlight, the glass expands or contracts again upon cooling. The spacer does not make these movements to the same extent. Consequently, this mechanical movement expands or compresses the adhesive bond, which can compensate these movements only to a limited extent through its own elasticity. During the course of the service life of the insulated glass unit, the mechanical stress described can entail a partial or complete areal detachment of the adhesive bond. This detachment of the adhesive bond can subsequently enable penetration of humidity inside the insulated glass unit. These climatic loads can lead to condensation in the region of the panes and a decrease in the insulating effect. It is thus worth the effort to equalize the coefficients of linear expansion of glass and spacers as much as possible.

The thermal insulation properties of insulated glass units are quite significantly influenced by the thermal conductivity in the region of the edge seal, in particular of the spacer. In the case of metallic spacers, the high thermal conductivity of the metal causes the formation of a thermal bridge at the edge of the glass. This thermal bridge leads, on the one hand, to heat losses in the edge region of the insulated glass Unit and, on the other, with high humidity and low outside pressures, to the formation of condensation on the inner pane in the region of the spacer. To solve these problems, thermally optimized so-called "warm-edge" systems in which the spacers are made of materials with lower thermal conductivity, in particular plastics, are increasingly used.

From the standpoint of thermal conductivity, polymeric spacers are to be preferred over metallic spacers. However, polymeric spacers have several disadvantages. For one thing, the tightness of polymeric spacers relative to moisture and gas loss is insufficient Here, there are various solutions, in particular by applying a barrier film on the outer side of the spacer (see, for example, WO2013/104507 A1).

Secondly, the coefficients of linear expansion of plastics are much greater than those of glass. To equalize the coefficients of linear expansion, glass fibers can be mixed in (see, for example, EP0852280 A1 and DE19807454 A1). However, increased glass fiber content worsens the heat conducting properties of the spacer such that precise optimization must be carried out here. Glass fibers and similar fillers also improve the longitudinal rigidity of the spacer.

Polymeric glass-fiber-reinforced spacers are so brittle that, in contrast to metallic spacers, they cannot be cold bent. To produce a spacer frame for an insulated glass unit, multiple pieces of spacer must be connected via plug connectors and glued or welded. Each connection point must be carefully sealed. One approach for increasing bendability is the integration of a metal strip into the polymeric main body (described, for example, in WO2015/043848 A1 and DE19807454 A1). However, the integration of a metallic strip into the polymeric main body during production is very complex.

Polymeric spacers without additional fillers such as glass fibers are flexible and not sufficiently rigid. However, longitudinal rigidity (refers to deflection in the longitudinal direction) is important for machine processability. An improvement in longitudinal rigidity can be achieved through the integration of metallic strips (see previous point) or through external application of metallic elements on the body (see, for example, EP1055046 B2 and EP3241972 A1). However, application of a metallic strip negatively affects the heat conducting properties of the spacer since the metallic elements have increased thermal conductivity. A particular difficulty in the external application of individual metallic elements is the perfect sealing of the edge seal against the penetration of moisture.

During production of an insulated glass unit, presses are used to press spacers and the glass panes together. These exert pressure on the spacer that can result in damage to the spacer if the pressure is too high.

DE 10 2011 009 359 A1 discloses a spacer profile with a hollow profile body made from a first plastic material and a diffusion barrier region made from a second plastic material with sheet silicate that is designed at least as part of the outer wall of the hollow profile to form a diffusion barrier.

WO 2015/086459 A1 discloses spacers for insulated glazing with an extruded sealing profile, and WO 2018/050357 A1 discloses spacers with a groove for accommodating a pane.

U.S. Pat. No. 4,113,905 discloses a composite foam spacer comprising a thin extruded core and a relatively thick foam layer that is cast onto the core.

Since the problems and individual solutions listed above are interrelated and influence each other, an overall solution that combines all these problems into an acceptable solution must be found.

The object of the present invention is, consequently, to provide an improved spacer that does not have the above-mentioned disadvantages and to provide an improved insulated glass unit and a simplified method for its production.

The object of the present invention is accomplished according to the invention by a spacer for insulated glass units according to the independent claim 1. Preferred embodiments of the invention emerge from the dependent claims.

A method for producing the spacer according to the invention, an insulated glass unit according to the invention, a method for producing the insulated glass unit according to the invention, and their use according to the invention emerge from further independent claims.

The spacer according to the invention for insulated glass units comprises at least a main body with a first side wall, a second side wall arranged parallel thereto, a glazing interior wall, an outer wall, and a cavity. The cavity is enclosed by the side walls; the glazing interior wall, and the outerwall. The glazing interior wall is arranged substantially perpendicular to the side walls and joins the first side wall to the second side wall. The side walls are the walls of the main body to which the outer panes of the insulated glass unit are attached. The glazing interior wall is the wall of the main body, which, after installation in the finished insulated glass unit, faces the inner interpane space. The outerwall is arranged substantially parallel to the glazing interior wall and joins the first side wall to the second side wall, with the first side wall connected to the outerwall directly or via a first connecting wall and with the second side wall connected to the outer wall directly or via a second connecting wall. After installation in the finished insulated glass unit, the outer wall faces the outer interpane space. The cavity of the main body is enclosed by the side walls, the glazing interior wall, and the outer wall or by the side walls, the glazing interior wall, the outer wall, and the connecting walls.

According to the invention, the main body comprises a first plastic and a second plastic, with the second plastic having lower thermal conductivity and higher flexibility than the first plastic.

According to the invention, the main body is implemented as a hollow profile formed from a second plastic, in which a first plastic is arranged on the inside directly adjacent the hollow profile at least in some regions.

Preferably, the first plastic is arranged inside the hollow profile formed from the second plastic, at least in the region of the side walls.

Preferably, the second plastic has thermal conductivity that is lower by at least 15%, particularly preferably by at least 20% than the first plastic.

Preferably, the second plastic has flexibility that is higher by at least 5%, particularly preferably by at least 10%, most preferably by at least 30%, than the first plastic.

According to the invention, the main body of the spacer is a main body co-extruded from a first plastic and a second plastic, i.e., the main body was produced by co-extrusion of a first plastic with a second plastic.

The optional first connecting wall and the optional second connecting wall preferably run at an angle α (alpha) of 30° to 60° relative to the outer wall. The angled shape of the first connecting wall and the second connecting wall improves the stability of the main body and enables better bonding and insulation of the spacer according to the invention.

A desiccant can be arranged in the cavity of the spacer. In addition, perforations that establish a connection to the inner interpane space in the insulated glass unit can be made in the glazing interior wall. Desiccant present in the in the cavity can then absorb moisture from the inner interpane space via the perforations in the glazing interior wall.

Due to the fact that, in the spacer according to the invention, the first plastic is arranged in the interior, it is not visible from the outside. Consequently, the first plastic does not have to meet the high optical requirements that the second plastic must meet. Thus, the first plastic can even contain a recycled material or be made from a recycled material. The inner first plastic can also be reused. In addition, the inner first plastic need not have UV resistance as high as that of the outer second plastic.

A further advantage of the spacer according to the invention is that due to the externally arranged second plastic, in combination with the internally arranged first plastic, the spacer becomes less sensitive to stresses, for example, during the pressing procedure for producing the insulated glass unit. The externally positioned second plastic does not have to absorb all loads; the internally positioned first plastic can absorb them. Mechanical force distribution is thus possible. In addition, the insulation properties can be improved as a result of the combination of a first plastic with a second plastic that has lower thermal conductivity.

In one embodiment of the spacer according to the invention, the first plastic is a glass-fiber-reinforced plastic and the second plastic is a plastic that has a lower glass fiber content than the first plastic or is free of glass fibers. Preferably, the glass fiber content of the glass-fiber-reinforced plastic is 10% to 40%, in particular 25% to 40%.

In one embodiment of the spacer according to the invention, the first plastic is an unfoamed plastic and the second plastic is a foamed plastic.

In one embodiment of the spacer according to the invention, both the first plastic and the second plastic are a foamed plastic and the first plastic is a glass-fiber-reinforced plastic.

The first plastic and the second plastic can be plastics based on the same polymer or copolymer; however, it is also possible for the first plastic and the second plastic to be based on different polymers or copolymers.

The first plastic and the second plastic contain, independently of one another, for example, thermoplastic elastomers (TPE), thermoplastic polyurethanes (TPU), polypropylene (PP), styrene acrylonitrile copolymer (SAN), polyethylene (PE), polycarbonates (PC), polystyrene, polyesters, polymethyl methacrylates, polyacrylates, polyamides, polyethylene terephthalate (PET), polybutylene terephthalate (FBI), preferably acrylonitrile butadiene styrene (ABS), polypropylene (PP), acrylonitrile-styrene-acrylester (ASA), acrylonitrile butadiene styrene—polycarbonate (ABS/PC), styrene acrylonitrile (SAN), PET/PC, PBT/PC, and/or copolymers or mixtures thereof.

As described above, the first plastic can also be a recycled material or the first plastic can contain a recycled material.

In a preferred embodiment, the first plastic is a glass-fiber-reinforced PP with a glass fiber content of 40%; and the second plastic, a PP that is not glass fiber reinforced.

In another preferred embodiment, the first plastic is a glass-fiber-reinforced SAN with a glass fiber content of 35%; and the second plastic, an SAN that is not glass fiber reinforced.

In another preferred embodiment, the first plastic is a glass-fiber-reinforced SAN with a glass fiber content of 35%; and the second plastic, a TPU that is not glass fiber reinforced.

In another preferred embodiment, the first plastic is a glass-fiber-reinforced SAN with a glass fiber content of 35%; and the second plastic, a PP that is not glass fiber reinforced.

In another preferred embodiment, the first plastic is a glass-fiber-reinforced PP with a glass fiber content of 40%; and the second plastic, a SAN that is not glass fiber reinforced.

In another preferred embodiment, the first plastic is a glass-fiber-reinforced PP with a glass fiber content of 40%; and the second plastic, a TPU that is not glass fiber reinforced.

In another preferred embodiment, the first plastic is a glass-fiber-reinforced ABS with a glass fiber content of 30%; and the second plastic, an ABS that is not glass fiber reinforced.

In another preferred embodiment, the first plastic is a glass-fiber-reinforced ABS with a glass fiber content of 30%; and the second plastic, a TPU that is not glass fiber reinforced.

In another preferred embodiment, the first plastic is a glass-fiber-reinforced ABS with a glass fiber content of 30%; and the second plastic, a PP that is not glass fiber reinforced.

In another preferred embodiment, the first plastic is a glass-fiber-reinforced PP with a glass fiber content of 40%; and the second plastic, an ABS that is not glass fiber reinforced.

In a preferred embodiment, the second plastic is a foamed plastic.

In a preferred embodiment, at least the first side wall, the second side wall, and also, if present, the first connecting wall and the second connecting wall are made of both the first plastic and the second plastic, with the plastics not mixed, but, instead, arranged next to one another. In the embodiments in which these walls are made of both plastics, the first plastic is directly adjacent the cavity of the main body, i.e., arranged internally; and the second plastic is arranged externally, i.e., not directly adjacent the cavity. As a result of the external arrangement of the second plastic, it can provide for better insulation and/or better adhesion of a barrier film and/or better appearance.

In one embodiment, the main body of the spacer consists, on the inside, of the first plastic and, on the outside, of the second plastic. "Inside" means the regions of the main body that are adjacent the cavity; and "outside", the regions that are not adjacent the cavity. Thus, in this embodiment, the first side wall, the second side wall, the glazing interior wall, the outer wall, and also, if present, the first connecting wall and the second connecting wall of the main body are made of the first plastic and the second plastic, wherein the regions of the main body directly adjacent the cavity are made of the first plastic, and the regions of the main body not directly adjacent the cavity are made of the second plastic. Thus, in this embodiment, the main body comprises a hollow profile formed from the first plastic, which is completely sheathed by the second plastic or, in other words, comprises a hollow profile formed from a second plastic, in which a hollow profile made from a first plastic is arranged directly adjacent, on the inside.

In another embodiment, the first side wall, the second side wall, the outer wall, and also, if present, the first connecting wall and the second connecting wall of the main body are made of the first plastic and the second plastic, wherein regions of the main body directly adjacent the cavity are made of the first plastic and regions of the main body not directly adjacent the cavity are made of the second plastic, and the glazing interior wall of the main body is made of the second plastic. Thus, in this embodiment, the main body consists of a hollow profile formed from the second plastic, in which a substantially U-shaped profile made from the first plastic is arranged on the inside in the region of the outer wall, the first side wall, and the second side wan, and also, if present, in the region of the first connecting wall and the second connecting wall.

In another embodiment, the first side wall, the second side wall, the glazing interior wall, and also, if present, the first connecting wall and the second connecting wall of the main body are made of the first plastic and the second plastic, wherein regions of the main body directly adjacent the cavity are made of the first plastic and regions of the main body not directly adjacent the cavity are made of the second plastic, and the outer wall of the main body is made of the second plastic.

In another embodiment, the first side wall, the second side wall, and also, if present, the first connecting wall and the second connecting wall of the main body are made of the first plastic and the second plastic, wherein regions of the main body directly adjacent the cavity are made of the first plastic and regions of the main body not directly adjacent the cavity are made of the second plastic, and the outer wall and the glazing interior wall of the main body are made of the second plastic.

In one embodiment, the main body additionally has a recess. This recess runs parallel to the side walls of the hollow body and is suitable for accommodating a pane. The bottom of the recess is preferably formed by the outer wall. As a result, the greatest possible depth of the recess is obtained and the area of the side flanks of the recess for stabilizing the pane accommodated in the recess is maximized.

The main body preferably has, along the glazing interior wall, a width of 5 mm to 80 mm, preferably of 10 mm to 20 mm. In the context of the invention, the width is the dimension extending between the side walls. The width is the distance between the surfaces of the two side walls facing away from one another. The selection of the width of the glazing interior wall determines the distance between the panes of the insulated glass unit. The exact dimension of the glazing interior wall is governed by the dimensions of the insulated glass unit and the desired size of the interpane space.

The main body preferably has, along the side walls, a height of 5 mm to 15 mm, particularly preferably of 5 mm to 10 mm. In this range for the height, the spacer has advantageous stability, but is, on the other hand, advantageously inconspicuous in the insulated glass unit. In addition, the cavity of the spacer has an advantageous size for accommodating a suitable amount of desiccant. The height of the spacer is the distance between the surfaces of the outer wall and the glazing interior wall facing away from one another.

The glazing interior wall, the outerwall, the connecting walls, and the side walls are preferably 0.5 mm to 1.5 mm thick, particularly preferably 0.8 mm to 1.0 mm thick.

The main body preferably contains a desiccant within the cavity, preferably silica gels, molecular sieves, $CaCl_2$), $Na_2SO_4$, activated carbon, silicates, bentonites, zeolites, and/or mixtures thereof. The desiccant can be filled in directly before the assembly of the insulated glass unit. This ensures a particularly high absorption capacity of the desiccant in the finished insulated glass unit. The glazing interior wall preferably has openings/perforations that permit absorption of the atmospheric humidity by the desiccant contained in the main body.

The first side wall and the second side wall are the sides of the spacer on which the outer panes of an insulated glass unit are mounted during installation of the spacer. The first side wall and the second side wall run parallel to one another.

The outer wall of the main body is the wall that is opposite the glazing interior wall and that faces away from the interior of the insulated glass unit (inner interpane space) in the direction of the outer interpane space. The outer wall preferably runs substantially perpendicular to the side walls.

By combining two plastics having different properties in terms of flexibility and thermal conductivity, specific locations in the main body of the spacer can be designed to be thermally or mechanically optimized.

In particular, in the case of complete sheathing of a hollow profile made of a first plastic by a second plastic, suitable selection of the second plastic enables improvement of even more properties such as adhesion to the film, UV resistance, or visual appearance. Thus, for example, also as described above, the first plastic can be a recycled material that is covered by the second plastic when completely sheathed to ensure a visually appealing appearance.

In a preferred embodiment of the spacer according to the invention, the first plastic and/or the second plastic are foamed plastics. In this way, the thermal properties of the spacer can be even further improved.

In one embodiment, the spacer has a barrier film. The barrier film is preferably arranged on the outer wall, the first connecting wall, and the second connecting wall, and at least on a part of the side walls. The barrier film can, for example, be attached to the main body with an adhesive. The barrier film comprises, for example, a metal-containing barrier layer of 7-µm-thick aluminum, a polymeric layer of 12-µm-thick polyethylene terephthalate (PET), and a metal-containing thin layer of 10-µm-thick aluminum. Polyethylene terephthalate is particularly suitable for protecting the 7-µm-thick aluminum layer against mechanical damage, since PET films are characterized by particularly high tear resistance. The film layers are, for example, arranged such that the aluminum layers, i.e., the metal-containing barrier layer and the metal-containing thin layer, are on the outside. The film is preferably arranged on a main body such that the metal-containing barrier layer faces the outer wall. Then, the metal-containing thin layer faces outward and simultaneously acts as an adhesive layer for the material of the secondary sealant. Thus, the metal-containing thin layer has not only a barrier effect but also has the function of an adhesion promoter. The barrier film can include a foamed polymer layer for further improvement of the thermal properties.

The invention also includes a method for producing a spacer according to the invention, at least comprising the step of co-extrusion of the first plastic and the second plastic to form the main body.

The invention further includes an insulated glass unit with at least a first pane, a second pane, a spacer according to the invention arranged perimetrally between the first and the second pane, an inner interpane space, and an outer interpane space. The spacer according to the invention is arranged to form a perimetral spacer frame. The first pane is attached to the first side wall of the spacer via a primary sealant, and the second pane is attached to the second side wall via a primary sealant. This means that a primary sealant is arranged between the first side wall and the first pane as well as between the second side wall and the second pane. The primary sealant makes contact with the side walls or with a barrier film, which can optionally be attached to the side walls, the optional connecting walls, and the outer wall of the main body. The first pane and the second pane are arranged parallel and preferably congruently. The edges of the two panes are therefore arranged flush in the edge region, i.e., they are at the same height. The inner interpane space is delimited by the first and second pane and the glazing interior wall. The outer interpane space is defined as the space that is delimited by the first pane, the second pane, and the optional barrier film on the outer wall or the outer wall of the main body. The outer interpane space is at least partially filled with a secondary sealant. The secondary sealant contributes to the mechanical stability of the insulated glass unit and absorbs some of the climatic loads that act on the edge seal.

In a preferred embodiment of the insulated glass unit according to the invention, with the presence of a barrier film, the primary sealant extends all the way to the regions of the first and second side wall adjacent the glazing interior wall, which are free of the barrier film. Thus, the primary sealant covers the transition between the main body and the barrier film such that a particularly good seal of the insulated glass unit is achieved. In this manner, the diffusion of moisture into the cavity of the spacer where the barrier film is adjacent the plastic is reduced (less interfacial diffusion).

In another preferred embodiment of the insulated glass unit according to the invention, the secondary sealant is applied along the first pane and the second pane such that a central region of the outer wall is free of secondary sealant. The "central region" refers to the region arranged centrally relative to the two outer panes, in contrast to the two outer regions of the outer wall, which are adjacent the first pane and the second pane. In this manner, good stabilization of the insulated glass unit is obtained, while, at the same time, material costs for the secondary sealant are saved. At the same time, this arrangement is easily produced by applying two strands of secondary sealant on the outer wall in the outer region adjacent the outer panes in each case.

In another preferred embodiment, the secondary sealant is attached such that the entire outer interpane space is completely filled with secondary sealant. This results in maximum stabilization of the insulated glass unit.

Preferably, the secondary sealant contains polymers or silane-modified polymers, particularly preferably organic polysulfides, silicones, room-temperature-vulcanizing (RTV) silicone rubber, peroxide-vulcanizing silicone rubber, and/or addition-vulcanizing silicone rubber, polyurethanes, and/or butyl rubber. These sealants have a particularly good stabilizing effect.

The primary sealant preferably contains a polyisobutylene. The polyisobutylene can be a cross-linking or non-cross-linking polyisobutylene.

The first pane and the second pane of the insulated glass unit preferably contain glass, ceramic, and/or polymers, particularly preferably quartz glass, borosilicate glass, soda lime glass, polymethyl methacrylate, or polycarbonate.

The first pane and the second pane have a thickness of 2 mm to 50 mm, preferably 3 mm to 16 mm, with the two panes possibly even having different thicknesses.

In a preferred embodiment of the insulated glass unit according to the invention, the spacer frame consists of one or a plurality of spacers according to the invention. For example, one spacer according to the invention can be bent to forma complete frame. Also, multiple spacers according to the invention can be linked to one another by one or a plurality of plug connectors. The plug connectors can be implemented as longitudinal connectors or corner connectors. Such corner connectors can, for example, be implemented as plastic molded parts with a seal, in which two mitered spacers abut.

In principle, a wide variety of geometries of the insulated glass unit are possible, for example, rectangular, trapezoidal, and rounded shapes. To produce round geometries, the spacer according to the invention can, for example, be bent in the heated state.

In another embodiment, the insulating glazing includes more than two panes. In this case, the spacer can include recesses in which at least one additional pane is arranged. Multiple panes could also be laminated glass panes.

The invention further includes a method for producing an insulated glass unit according to the invention at least comprising the steps:
Providing a spacer according to the invention,
Joining the spacer to form a spacer frame,
Providing a first pane and a second pane,
Fixing the spacer between the first pane and the second pane via a primary sealant,
Pressing the pane assembly composed of the two panes and the spacer, and
At least partially filling the outer interpane space with a secondary sealant.

The insulated glass unit is produced by machine on double glazing systems known to the person skilled in art. First, a spacer frame including the spacer according to the invention is provided. For example, the spacer frame is produced by welding, gluing, and/or using a plug connector. A first pane and a second pane are provided, and the spacer frame is fixed between the first and the second pane via a primary sealant. The spacer frame is placed with the first side wall of the spacer on the first pane and fixed via the primary sealant. Then, the second pane is placed congruently with the first pane on the second side wall of the spacer and likewise fixed via the primary sealant, and the pane assembly is pressed. The outer interpane space is at least partially filled with a secondary sealant. The method according to the invention thus enables the simple and economical production of an insulated glass unit, No special new machines are required, since, thanks to the design of the spacer according to the invention, conventional machines as are already available for spacers known from the prior art can be used.

The first pane and the second pane can also be provided before providing the spacer frame according to the invention.

As described above, when the spacer frame is provided, the main body of the spacer is manufactured by co-extrusion of a first plastic with a second plastic.

The invention further includes the use of the insulated glass unit according to the invention as building interior glazing, building exterior glazing, and/or façade glazing.

The various embodiments of the invention can be implemented individually or in any combinations. In particular, the features mentioned above and explained below can be used not only in the combinations indicated but also in other combinations or in isolation without departing from the scope of the present invention.

The invention is explained in detail in the following with reference to drawings and exemplary embodiments. The drawings are purely schematic representations and not to scale. The drawings in no way restrict the invention.

They depict.

Figure 1:
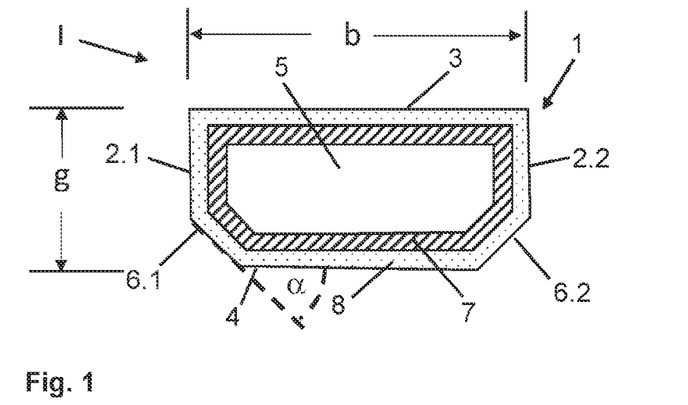
FIG. 1 a cross-section of an embodiment of a spacer according to the invention,
FIG. 2 a cross-section of another embodiment of a spacer according to the invention,
FIG. 3 a cross-section of another embodiment of a spacer according to the invention,
FIG. 4 a cross-section of another embodiment of a spacer according to the invention,
FIG. 5 a cross-section of another embodiment of a spacer according to the invention,
FIG. 6 a cross-section of another embodiment of a spacer according to the invention,
FIG. 7 a cross-section of another embodiment of a spacer according to the invention,
FIG. 8 a perspective view of a cross-section of an embodiment of a spacer according to the invention,
FIG. 9, a cross-section of an embodiment of an insulated glass unit according to the invention, and
FIG. 10 a flow chart of a method according to the invention.

FIG. 1 depicts a cross-section of an embodiment of a spacer I according to the invention. In the embodiment depicted in FIG. 1, the spacer I comprises a main body 1, formed from a first side wall 2.1, a second side wall 2.2 arranged parallel thereto, a glazing interior wall 3, an outer wall 4, a first connecting wall 6.1, a second connecting wall 6.2, and a cavity 5. The first side wall 2.1 and the second side wall 2.2 are connected to one another via the glazing interior wall 3. The outer wall 4 is arranged substantially parallel to the glazing interior wall 3 and is connected to the first side wall 2.1 via the first connecting wall 6.1 and to the second side wall 2.2 via the second connecting wall 6.2. The first connecting wall 6.1 and the second connecting wall 6.2 are optional; alternatively, the first side wall 2.1 and the second side wall 2.2 can also be directly connected to the glazing interior wall 3. The cavity 5 is enclosed by the first side wall 2.1, the glazing interior wall 3, the second side wall 2.2, the first connecting wall 6.1, the second connecting wall 6.2, and the outer wall 4. The connecting walls 6.1, 6.2 preferably run at an angle $\alpha$ (alpha) of 30° to 60° relative to the outerwall 4. The angled shape of the first connecting wall 6.1 and the second connecting wall 6.2 improves the stability of the main body and enables better bonding and insulation of the spacer I according to the invention.

The main body 1 is made of a first plastic 7 and a second plastic 8, with, in the embodiment depicted in FIG. 1, the first side wall, 2.1, the second side wall 2.2, the glazing interior wall 3, the outer wall 4, the first connecting wall 6.1, and the second connecting wall 6.2 made of the first plastic 7 and the second plastic 8, with the regions of the main body 1 directly adjacent the cavity 5 made of the first plastic 7 and the regions of the main body 1 not directly adjacent the cavity 5 made of the second plastic 8. Thus, in the embodiment depicted in FIG. 1, the main body 1 consists of a hollow profile formed from the first plastic 7, which is completely sheathed by the second plastic 8 or, in other words, consists of a hollow profile formed from a second plastic 8, in which a hollow profile made from a first plastic 7 is arranged directly adjacent on the inside.

The wall thickness of the main body 1 is, for example, 1.5 mm, with the wall thickness of the hollow profile formed from the first plastic 7 being 0.75 mm and the thickness of the sheathing by the second plastic 8 also being 0.75 mm. The width b of the main body 1 along the glazing interior surface 3 is, for example, 12 mm. The total height g of the main body 1 is, for example, 6.5 mm.

The first plastic 7 is, for example, polypropylene (PP) with a glass fiber content of 40%; and the second plastic 8, for example, polypropylene (PP) that contains no glass fibers.

The cavity 5 can accommodate a desiccant 9 (not shown in FIG. 1). Perforations 10 (not shown in FIG. 1) that establish a connection to the inner interpane space 15 in the insulated glass unit can be made in the glazing interior wall 3. The desiccant 9 can then absorb moisture from the inner interpane space 15 via the perforations 10 in the glazing interior wall 3.

The main body 1 of the embodiment depicted in FIG. 1 of a spacer I according to the invention is produced by co-extrusion of the first plastic 7 and the second plastic 8.

Figure 2:
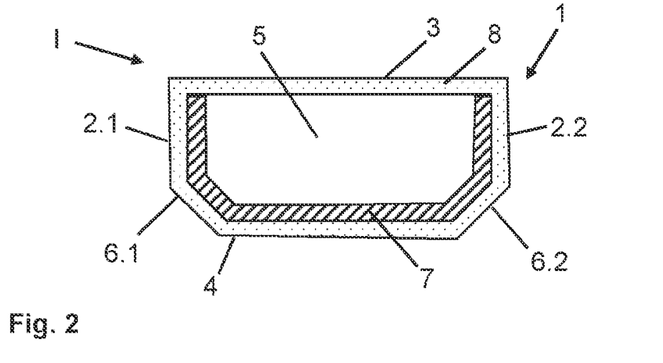

FIG. 2 depicts a cross-section of another embodiment of a spacer I according to the invention. In the embodiment depicted in FIG. 2, the spacer I comprises a main body 1, which is formed from a first side wall 2.1, a second side wall 2.2 arranged parallel thereto, a glazing interior wall 3, an outer wall 4, a first connecting wall 6.1, a second connecting wall 6.2, and a cavity 5. The first side wall 2.1 and the second side wall 2.2 are connected to one another via the glazing interior wall 3. The outer wall 4 is arranged substantially parallel to the glazing interior wall 3 and is connected to the first side wall 2.1 via the first connecting wall 6.1 and connected to the second side wall 2.2 via the second connecting wall 6.2. The cavity 5 is enclosed by the first side wall 2.1, the glazing interior wall 3, the second side wall 2.2, the first connecting wall 6.1, the second connecting wall 6.2, and the outer wall 4. The connecting walls 6.1, 6.2 preferably run at an angle α (alpha) of 30° to 60° relative to the outerwall 4. The angled shape of the first connecting wall 6.1 and the second connecting wall 6.2 improves the stability of the main body and enables improved bonding and insulation of the spacer I according to the invention.

In the embodiment depicted in FIG. 2, the glazing interior wall 3 is made of the second plastic 8. The first side wall 2.1, the second side wall 2.2, the outer wall 4, the first connecting wall 6.1, and the second connecting wall 6.2 are made of the first plastic 7 and the second plastic 8, with the regions of the main body 1 directly adjacent the cavity 5 made of the first plastic 7 and the regions of the main body 1 not directly adjacent the cavity 5 made of the second plastic 8. Thus, in the embodiment depicted in FIG. 2, the main body 1 consists of a hollow profile formed from the second plastic 8, in which a substantially U-shaped profile made of the first plastic 7 is arranged, on the inside, in the region of the outer wall 4, the first connecting wall 6.1, the second connecting wall 6.2, the first side wall 2.1, and the second side wall 2.2.

The wall thickness of the main body 1 is, for example, 1.5 mm in the regions in which the wall is formed by both the first plastic 7 and the second plastic 8, with the portion of the first plastic 7 in the wall thickness being 0.75 mm and the portion of the second plastic 8 in the wall thickness likewise being 0.75 mm. In the region in which the wall is formed only by the second plastic 8, the wall thickness is, for example, 0.75 mm. The width b of the main body 1 along the glazing interior surface 3 is, for example, 12 mm. The total height g of the main body 1 is, for example, 6.5 mm.

In the embodiment depicted in FIG. 2, the first plastic 7 is, for example, acrylonitrile butadiene styrene (ABS) with a glass fiber content of 30% and the second plastic is a thermoplastic polyurethane.

The cavity 5 can accommodate a desiccant 9 (not shown in FIG. 2). Perforations 10 (not shown in FIG. 2) that establish a connection to the inner interpane space 15 in the insulated glass unit II can be made in the glazing interior wall 3. The desiccant 9 can then absorb moisture from the inner interpane space 15 via the perforations 10 in the glazing interior wall 3.

The main body 1 of the embodiment of a spacer I according to the invention depicted in FIG. 2 is produced by co-extrusion of the first plastic 7 and the second plastic 8.

Figure 3:
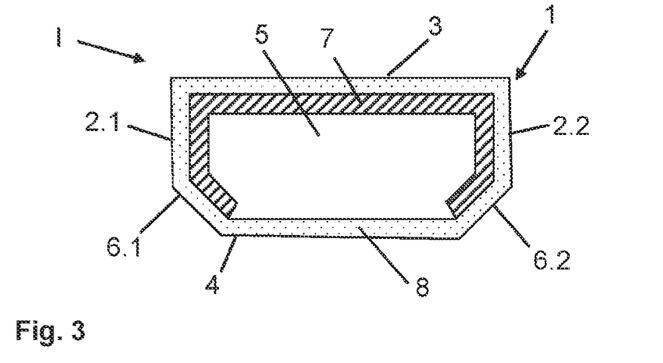

FIG. 3 depicts a cross-section of another embodiment of a spacer I according to the invention. In the embodiment depicted in FIG. 3, the spacer I comprises a main body 1, which is formed from a first side wall 2.1, a second side wall 2.2 arranged parallel thereto, a glazing interior wall 3, and outer wall 4, a first connecting wall 6.1, a second connecting wall 6.2, and a cavity 5. The first side wall 2.1 and the second side wall 2.2 are connected to one another via the glazing interior wall 3. The outer wall 4 is arranged substantially parallel to the glazing interior wall 3 and is connected to the first side wall 2.1 via the first connecting wall 6.1 and connected to the second side wall 2.2 via the second connecting wall 6.2. The cavity 5 is enclosed by the first side wall 2.1, the glazing interior wall 3, the second side wall 2.2, the first connecting wall 6.1, the second connecting wall 6.2, and the outer wall 4. The connecting walls 6.1, 6.2 preferably run at an angle α (alpha) of 30° to 60° relative to the outerwall 4. The angled shape of the first connecting wall 6.1 and the second connecting wall 6.2 improves the stability of the main body and enables improved bonding and insulation of the spacer I according to the invention.

In the embodiment depicted in FIG. 3, the outer wall 4 is made from the second plastic 8. The first side wall, 2.1, the second side wall 2.2, the glazing interior wall 3, the first connecting wall 6.1, and the second connecting wall 6.2 are made of the first plastic 7 and the second plastic 8, with the regions of the main body 1 directly adjacent the cavity 5 made of the first plastic 7 and the regions of the main body 1 not directly adjacent the cavity 5 made of the second plastic 8. Thus, in the embodiment depicted in FIG. 3, the main body 1 consists of hollow profile formed from the second plastic 8, in which a profile made of the first plastic 7 is arranged, on the inside, in the region of the glazing interior wall 3, the first connecting wall 6.1, the second connecting wall 6.2, the first side wall 2.1, and the second side wall 2.2.

The wall thickness of the main body 1 is, for example, 1.5 mm in the regions in which the wall is formed by both the first plastic 7 and the second plastic 8, with the portion of the first plastic 7 in the wall thickness being 0.75 mm and the portion of the second plastic 8 in the wall thickness likewise being 0.75 mm. In the region in which the wall is formed only by the second plastic 8, the wall thickness is, for example, 0.75 mm. The width b of the main body 1 along the glazing interior surface 3 is, for example, 12 mm. The total height g of the main body 1 is, for example, 6.5 mm.

In the embodiment depicted in FIG. 3, the first plastic 7 is, for example, acrylonitrile butadiene styrene (ABS) with a glass fiber content of 30% and the second plastic 8 is a thermoplastic polyurethane.

The cavity 5 can accommodate a desiccant 9 (not shown in FIG. 3). Perforations 10 (not shown in FIG. 3) that establish a connection to the inner interpane space 15 in the insulated glass unit II can be made in the glazing interior wall 3. The desiccant 9 can then absorb moisture from the inner interpane space 15 via the perforations 10 in the glazing interior wall 3.

The main body 1 of the embodiment of a spacer I according to the invention depicted in FIG. 3 is produced by co-extrusion of the first plastic 7 and the second plastic 8.

Figure 4:
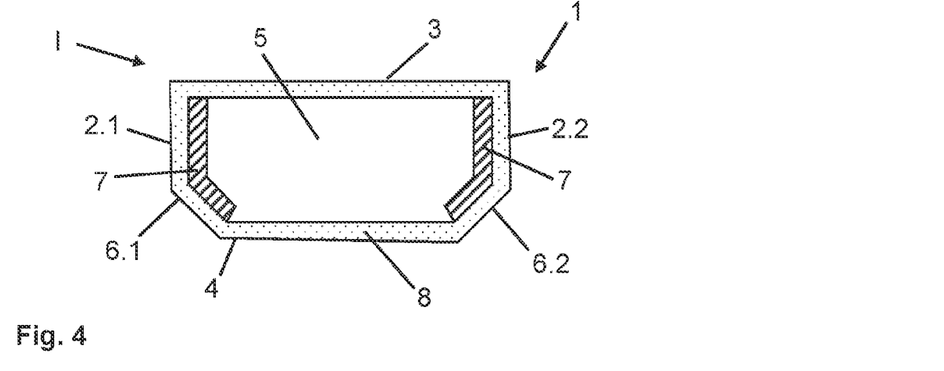

FIG. 4 depicts a cross-section of another embodiment of a spacer I according to the invention. The embodiment depicted in FIG. 4 differs from that depicted in FIG. 2 and FIG. 3 only in that the main body 1 in the embodiment depicted in FIG. 4 consists of a hollow profile formed from the second plastic 8, in which a profile made of the first plastic 7 is arranged, on the inside, only in the region of the first connecting wall 6.1, the second connecting wall 6.2, the first side wall 2.1, and the second side wall 2.2. Thus, in this embodiment, the first connecting wall 6.1, the second connecting wall 6.2, the first side wall 2.1, and the second side wall 2.2 are made of the first plastic 7 and the second plastic 8; and the glazing interior wall 3 and the outerwall 4 are made only of the second plastic 8.

The main body 1 of the embodiment of a spacer according to the invention depicted in FIG. 4 is produced by co-extrusion of the first plastic 7 and the second plastic 8.

Figure 5:
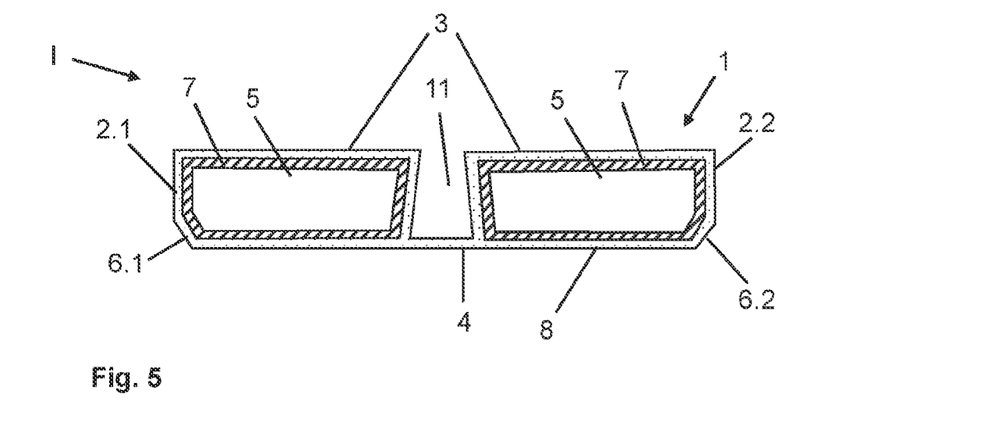

FIG. 5 depicts a cross-section of another embodiment of a spacer I according to the invention. The spacer I depicted in FIG. 5 corresponds substantially to the spacer I depicted in FIG. 1, wherein the main body 1 has a recess 11 in the glazing interior wall 3, running substantially parallel to the side walls 2.1 and 2.2, to accommodate a pane. The bottom of the recess 11 is formed by the outer wall 4, with this wall 4 consisting, in the region of the recess 11, only of the second plastic 8. However, it is also possible for the bottom of the recess 11 not to be adjacent the outer wall 4 and for one or both cavities 5 to extend below the recess 11 or for the bottom of the recess 11 to be made of the first plastic 7 and the second plastic 8.

The wall thickness of the main body 1 is, for example, 0.5 mm in the region of the recess 11 and 1 mm in the other regions of the main body 1. The width b of the main body 1 along the glazing interior surface 3 is, for example, 25 mm. The total height g of the main body 1 is, for example, 6.5 mm.

The first plastic 7 is, for example, acrylonitrile butadiene styrene (ABS) with a glass fiber content of 30%; and the second plastic 8, acrylonitrile butadiene styrene (ABS) that contains no glass fibers.

The cavities 5 can accommodate a desiccant 9 (not shown in FIG. 5). Perforations 10 (not shown in FIG. 5) that establish a connection to the inner interpane spaces 15 in the insulated glass unit can be made in the glazing interior wall 3. The desiccant 9 can then absorb moisture from the inner interpane spaces 15 via the perforations 10 in the glazing interior wall 3.

The main body 1 of the embodiment of the spacer I according to the invention depicted in FIG. 5 is produced by co-extrusion of the first plastic 7 and the second plastic 8.

Figure 6:
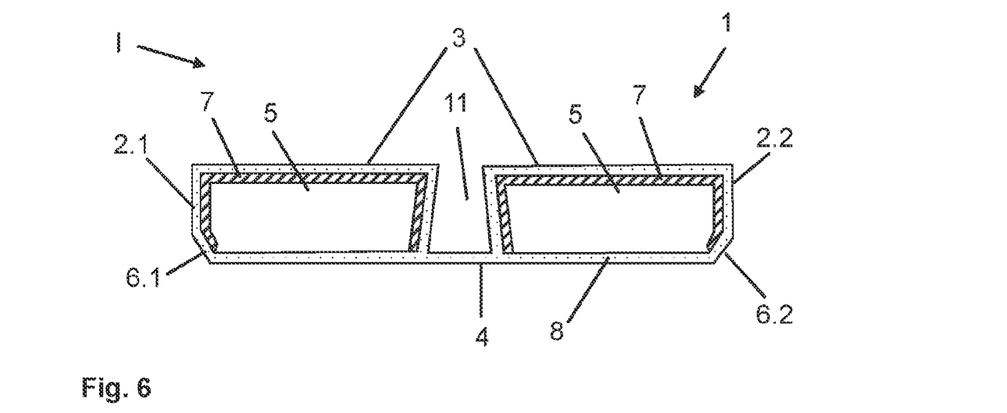

FIG. 6 depicts a cross-section of another embodiment of a spacer I according to the invention. The spacer I depicted in FIG. 6 corresponds substantially to the spacer I depicted in FIG. 3, wherein the main body 1 has, in the glazing interior wall 3, a recess 11, running substantially parallel to the side walls 2.1 and 2.2, to accommodate a pane. The bottom of the recess 11 is formed by the outer wall 4. In the embodiment depicted in FIG. 6, the outer wall is made only from the second plastic 8. It is also possible for the bottom of the recess 11 not to be adjacent the outer wall 4 and for one or both cavities 5 to extend below the recess 11 or for the bottom of the recess 11 to be made of the first plastic 7 and the second plastic 8.

The wall thickness of the main body 1 is, for example, 0.5 mm in the region of the recess 11 and 1 mm in the other regions of the main body 1. The width b of the main body 1 along the glazing interior surface 3 is, for example, 25 mm. The total height g of the main body 1 is, for example, 6.5 mm.

The first plastic 7 is, for example, a acrylonitrile butadiene styrene (ABS) with a glass fiber content of 30%; and the second plastic 8, acrylonitrile butadiene styrene (ABS) that contains no glass fibers.

The cavities 5 can accommodate a desiccant 9 (not shown in FIG. 6). Perforations 10 (not shown in FIG. 6) that establish a connection to the inner interpane spaces 15 in the insulated glass unit can be made in the glazing interior wall 3. The desiccant 9 can then absorb moisture from the inner interpane spaces 15 via the perforations 10 in the glazing interior wall 3.

The main body 1 of the embodiment of a spacer I according to the invention depicted in FIG. 6 is produced by co-extrusion of the first plastic 7 and the second plastic 8.

Figure 7:
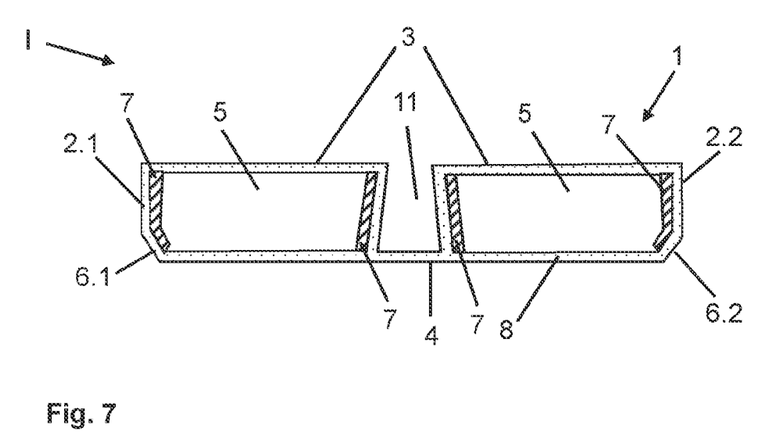

FIG. 7 depicts a cross-section of another embodiment of a spacer I according to the invention. The spacer I depicted in FIG. 7 corresponds substantially to the spacer I depicted in FIG. 4, wherein the main body 1 has, in the glazing interior wall 3, a recess 11, running substantially parallel to the side walls 2.1 and 2.2, to accommodate a pane. The bottom of the recess 11 is formed by the outer wall 4. In the embodiment depicted in FIG. 7; the outer wall is made only from the second plastic 8. It is also possible for the bottom of the recess 11 not to be adjacent the outer wall 4 and for one or both cavities 5 to extend below the recess 11 or for the bottom of the recess 11 to be made of the first plastic 7 and the second plastic 8. In the embodiment depicted in FIG. 7, the side walls of the recess are made of the first plastic 7 and the second plastic 8.

The wall thickness of the main body 1 is, for example, 0.5 mm in the region of the recess 11 and 1 mm in the other regions of the main body 1. The width b of the main body 1 along the glazing interior surface 3 is, for example, 25 mm. The total height g of the main body 1 is, for example, 6.5 mm.

The first plastic 7 is, for example, acrylonitrile butadiene styrene (ABS) with a glass fiber content of 30%; and the second plastic 8, acrylonitrile butadiene styrene (ABS) that contains no glass fibers.

The cavities 5 can accommodate a desiccant 9 (not shown in FIG. 7). Perforations 10 (not shown in FIG. 7) that establish a connection to the inner interpane spaces 15 in the insulated glass unit can be made in the glazing interior wall 3. The desiccant 9 can then absorb moisture from the inner interpane spaces 15 via the perforations 10 in the glazing interior wall 3.

The main body 1 of the embodiment of a spacer I according to the invention depicted in FIG. 7 is produced by co-extrusion of the first plastic 7 and the second plastic 8.

Figure 8:
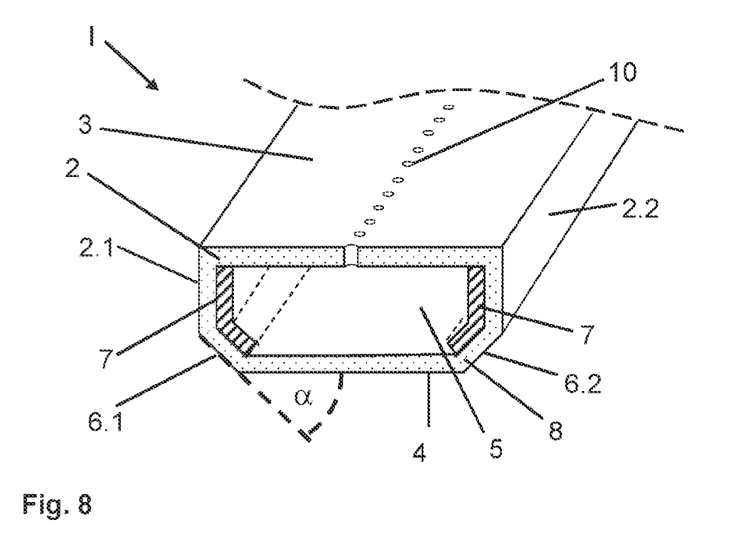

FIG. 8 depicts a perspective view of a cross-section of an embodiment of a spacer I according to the invention. The spacer I depicted in FIG. 8 corresponds to the spacer I depicted in FIG. 4. Due to the perspective view, the perforations 10 in the glazing interior wall 3 can be seen in FIG. 8.

Figure 9:
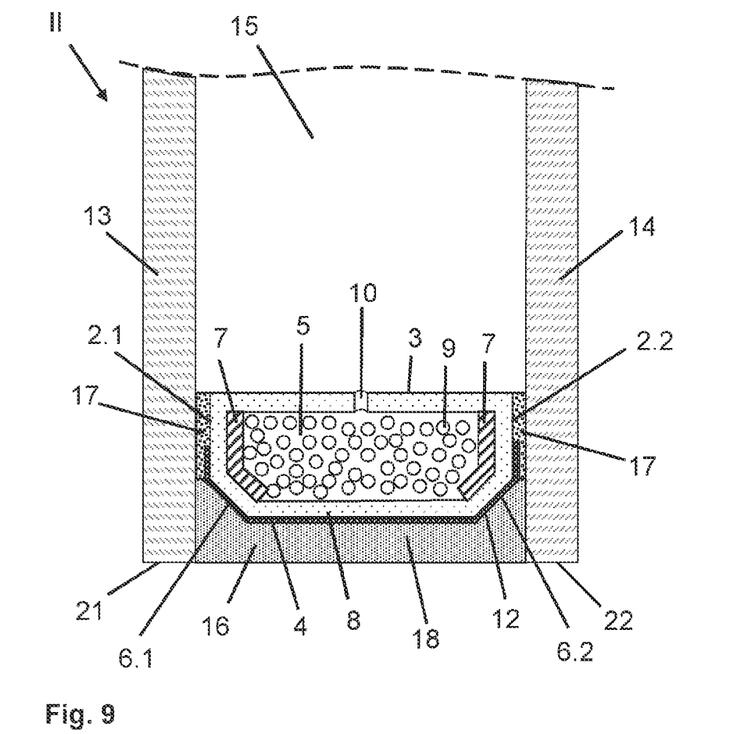

FIG. 9 depicts a cross-section of the insulated glass unit II according to the invention with a spacer I arranged between a first pane 13 and a second pane 14, which spacer substantially corresponds to that described in FIG. 4, wherein the spacer I used in the insulated glass unit II in FIG. 9 has a barrier film 12. The barrier film 12 is arranged on the outer wall 4, the first connecting wall 6.1, and the second connecting wall 6.2 and on a part of the side walls 2.1 and 2.2. The first pane 13, the second pane 14, and the barrier film 12 delimit the outer interpane space 16 of the insulated glass unit II. The edge 21 of the first pane 13 and the edge 22 of the second pane 14 are arranged at one and the same height. The secondary sealant 18, which contains, for example, a silicone, is arranged in the outer interpane space 16, Silicones absorb the forces acting on the edge seal particularly well and thus contribute to high stability of the insulated glass unit II. The barrier film 12, together with the secondary sealant 18, insulates the inner interpane space 15 and reduces heat transfer from the main body 1 into the inner interpane space 15. The barrier film 12 can, for example, be attached to the main body 1 with PUR hot melt adhesive, A primary sealant 17 is preferably arranged between the side walls 2.1 and 2.2 and the panes 13, 14. This contains, for example, butyl. The primary sealant 17 overlaps the barrier film 12 to prevent possible interfacial diffusion. The first pane 13 and the second pane 14 preferably have the same dimensions and thicknesses. The panes preferably have optical transparency of >85%. The panes 13, 14 preferably contain glass and/or polymers, preferably flat glass, float glass, quartz glass, borosilicate glass, soda lime glass, polymethyl methacrylate, and/or mixtures thereof. The first pane 13 and the second pane 14 are, for example, 3 mm thick. In an alternative embodiment, the first pane 13 and/or the second pane 14 can be implemented as a composite glass pane, A desiccant 9, for example, molecular sieve, is arranged within the cavity 5 of the main body 1, This desiccant 9 can be filled into the cavity 5 of the spacer I prior to assembly of the insulated glass unit II. The glazing interior wall 3 includes a perforation 10 that enables gas exchange with the inner interpane space 15.

The barrier film 12 comprises, for example, a metal-containing barrier layer of 7-μm-thick aluminum, a polymeric layer of 12-μm-thick polyethylene terephthalate (PET), and a metal-containing thin layer of 10-nm-thick aluminum, Polyethylene terephthalate is particularly suitable for protecting the 7-μm-thick aluminum layer against mechanical damage, since PET films are characterized by particularly high tear resistance. The film layers are, for example, arrange such that the aluminum layers, i.e., the metal-containing barrier layer and the metal-containing thin layer, are on the outside. The film is arranged on a main body 1 such that the metal-containing barrier layer faces the outer wall 4. Then, the metal-containing thin layer faces outward and simultaneously acts as an adhesion layer for the material of the secondary sealant. Thus, the metal-containing thin layer has not only a barrier effect but also functions as an adhesion promoter.

Figure 10:
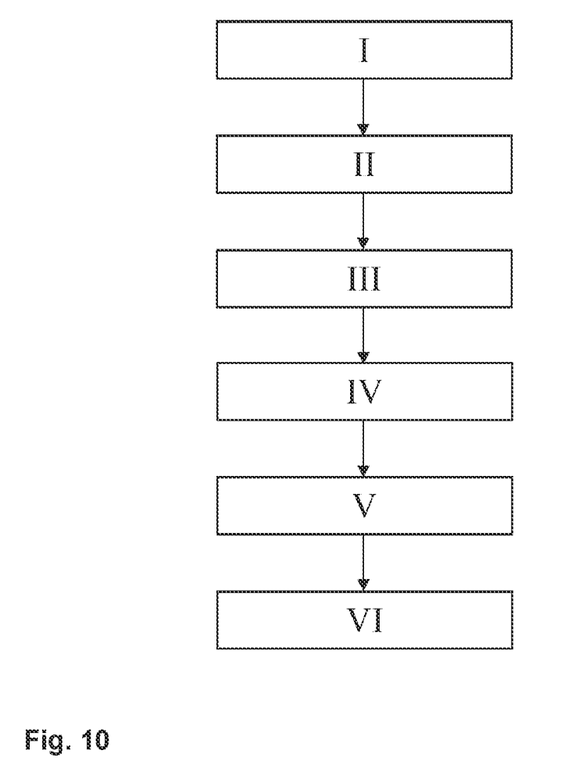

FIG. 10 depicts the flow chart of a method according to the invention for producing an insulated glass unit II according to the invention. In a first step I, a spacer I according to the invention is provided. In a second step II; the spacer I is joined together to form a spacer frame. In a third step III, a first pane 13 and a second pane 14 are provided. Alternatively, the third step III can also be carried out before the first step I. In a fourth step IV, the spacer I is fixed between the first pane 13 and the second pane 14 via a primary sealant 17. In a fifth step V, the pane assembly consisting of the panes 13, 14 and the spacer I are pressed in an insulated glass press. In a sixth step VI, the outer interpane space 16 is filled, at least partially, with a secondary sealant 18.

LIST OF REFERENCE CHARACTERS

I spacer
II insulated glass unit
1 main body
2.1 first side wall
2.2 second side wall
3 glazing interior wall
4 outer wall
5 cavity
6.1 first connecting wall
6.2 second connecting wall
7 first plastic
8 second plastic
9 desiccant
10 perforation in the glazing interior wall
11 recess
12 barrier film
13 first pane
14 second pane
15 inner interpane space
16 outer interpane space
17 primary sealant
18 secondary sealant
21 edge of the first pane
22 edge of the second pane
b width of the polymeric main body along the glazing interior surface
g total height of the main body along the pane contact surfaces

The invention claimed is:

1. A spacer for insulated glass units, comprising:
a main body co-extruded from a first plastic and a second plastic, comprising
a first side wall and a second side wall arranged parallel thereto,
a glazing interior wall, which connects the first and second side walls to one another;
an outer wall, which is arranged substantially parallel to the glazing interior wall and connects the first and second side walls to one another directly or via connecting walls;
a cavity, which is enclosed by the first and second side walls, the glazing interior wall, and the outer wall or by the first and second side walls, the glazing interior wall, the outer wall, and the connecting walls,
wherein the second plastic has lower thermal conductivity than the first plastic, and the main body is designed as a hollow profile, wherein the second plastic has an interior perimeter, and the first plastic directly contacts said interior perimeter, and an entire interior surface of the main body defines the cavity, wherein the entire interior surface is defined by a combination of the first plastic and the second plastic,
wherein the second plastic forming an exterior portion of the main body and sheathing the first plastic is more flexible than the first plastic, and
wherein the first side wall, the second side wall, the outer wall, the first connecting wall, and the second connecting wall of the main body are made from the first plastic and the second plastic such that a portion of the entire interior surface of the main body along the first side wall, the second side wall, the outer wall, the first connecting wall, and the second connecting wall is formed by the first plastic and a portion of the entire interior surface of the main body along the glazing interior wall is formed by the second plastic.

2. The spacer according to claim 1, wherein the first plastic contains or is made of a recycled material, and the second plastic contains no recycled material.

3. The spacer according to claim 1, wherein the first plastic is a glass-fiber-reinforced plastic and the second plastic has a lower glass fiber content than the first plastic or is a glass-fiber-free plastic.

4. The spacer according to claim 3, wherein the glass-fiber-reinforced plastic has a glass fiber content from 10% to 40%.

5. The spacer according to claim 1, wherein the first plastic and the second plastic are based on different polymers or copolymers.

6. The spacer according to claim 1, wherein the glazing interior wall has a recess running substantially parallel to the first and second side walls and to accommodate a pane.

7. The spacer according to claim 1, wherein the first plastic and/or the second plastic are foamed plastics.

8. A method for producing a spacer according to claim 1 comprising a step of co-extrusion of the first plastic and the second plastic to form the main body.

9. An insulated glass unit, at least comprising a first pane, a second pane, a spacer according to claim 1, perimetrally arranged between the first pane and the second pane, wherein
- the first pane is attached to the first side wall via a primary sealant,
- the second pane is attached to the second side wall via a primary sealant,
- the spacer separates an inner interpane space from an outer interpane space, and
- a secondary sealant is arranged in the outer interpane space.

10. A method for producing an insulated glass unit according to claim 9, comprising:
- providing the spacer;
- joining the spacer to form a spacer frame;
- providing the first pane and the second pane;
- fixing the spacer between the first pane and the second pane via the primary sealant;
- pressing a pane assembly composed of the first and second panes and the spacer; and
- filling the outer interpane space at least partially filled with the secondary sealant.

11. A method comprising manufacturing a building interior glazing, building exterior glazing, and/or façade glazing with the insulated glass unit according to claim 9.

12. A spacer for insulated glass units, comprising:
a main body co-extruded from a first plastic and a second plastic, comprising
  a first side wall and a second side wall arranged parallel thereto,
  a glazing interior wall, which connects the first and second side walls to one another;
  an outer wall, which is arranged substantially parallel to the glazing interior wall and connects the first and second side walls to one another directly or via connecting walls;
  a cavity, which is enclosed by the first and second side walls, the glazing interior wall, and the outer wall or by the first and second side walls, the glazing interior wall, the outer wall, and the connecting walls,
wherein the second plastic has lower thermal conductivity than the first plastic, and the main body is designed as a hollow profile, wherein the second plastic has an interior perimeter, and the first plastic directly contacts said interior perimeter, and an entire interior surface of the main body defines the cavity, wherein the entire interior surface is defined by a combination of the first plastic and the second plastic, wherein the second plastic forming an exterior portion of the main body and sheathing the first plastic is more flexible than the first plastic, and
wherein the first side wall, the second side wall, the glazing interior wall, the first connecting wall, and the second connecting wall of the main body are made from the first plastic and the second plastic such that a portion of the entire interior surface of the main body along the first side wall, the second side wall, the glazing interior wall, the first connecting wall, and the second connecting wall of the main body is formed from the first plastic and a portion of the entire interior surface of the main body along the outer wall of the main body is formed by the second plastic.

13. A spacer for insulated glass units, comprising:
a main body co-extruded from a first plastic and a second plastic, comprising
  a first side wall and a second side wall arranged parallel thereto,
  a glazing interior wall, which connects the first and second side walls to one another;
  an outer wall, which is arranged substantially parallel to the glazing interior wall and connects the first and second side walls to one another directly or via connecting walls;
  a cavity, which is enclosed by the first and second side walls, the glazing interior wall, and the outer wall or by the first and second side walls, the glazing interior wall, the outer wall, and the connecting walls,
wherein the second plastic has lower thermal conductivity than the first plastic, and the main body is designed as a hollow profile, wherein the second plastic has an interior perimeter, and the first plastic directly contacts said interior perimeter, and an entire interior surface of the main body defines the cavity, wherein the entire interior surface is defined by a combination of the first plastic and the second plastic, wherein the second plastic forming an exterior portion of the main body and sheathing the first plastic is more flexible than the first plastic, and
wherein the first side wall, the second side wall, the first connecting wall, and the second connecting wall of the main body are made from the first plastic and the second plastic such that a portion of the entire interior surface of the main body along the first side wall, the second side wall, the first connecting wall, and the second connecting wall of the main body is formed by the first plastic and a portion of the entire interior surface of the main body along the glazing interior wall and the outer wall of the main body is formed by the second plastic.

* * * * *